United States Patent [19]
Harashima

[11] Patent Number: 5,838,930
[45] Date of Patent: Nov. 17, 1998

[54] METHOD AND APPARATUS FOR CONTROLLING A COMMAND CYCLE ON A BUS

[75] Inventor: Shigeru Harashima, Tokyo, Japan

[73] Assignee: Kabushiki Kaisha Toshiba, Kawasaki, Japan

[21] Appl. No.: 705,939

[22] Filed: Aug. 29, 1996

[30] Foreign Application Priority Data

Aug. 30, 1995  [JP]  Japan ................................ 7-221828

[51] Int. Cl.[6] ........................... G06F 13/00; G06F 13/14
[52] U.S. Cl. ...................... 395/287; 395/856; 395/309; 395/281
[58] Field of Search ................................. 395/287, 281, 395/306, 308, 556, 842, 309, 856

[56]  References Cited

U.S. PATENT DOCUMENTS

| 5,404,481 | 4/1995 | Miyamori | 395/842 |
|---|---|---|---|
| 5,430,849 | 7/1995 | Banks | 395/308 |
| 5,491,814 | 2/1996 | Yee et al. | 395/556 |
| 5,557,757 | 9/1996 | Gephardt et al. | 395/306 |
| 5,621,902 | 4/1997 | Cases et al. | 395/309 |
| 5,664,124 | 9/1997 | Katz et al. | 395/309 |
| 5,673,400 | 9/1997 | Kenny | 395/309 |

FOREIGN PATENT DOCUMENTS 63-237157  10/1988  Japan .

OTHER PUBLICATIONS

"Mobile PC/PCI DMA Arbitration and Protocols, MHPG Architecture, Functional Architecture Specification," Intel Corporation, Apr. 22, 1996, pp. 1–27.

PCI Local Bus Specification, Revision 2.1, Jun. 1, 1995.

"BootStrap", Project 2, No. 4, 1993, pp. 1–3 and 64–71, Oct. 1993.

"System Board", IBM Technical Reference, Section 1, Mar. 1984.

"82C37A–5 CHMOS High Performance Programmable DMA Controller," Peripheral Components, Intel Corporation, Sep. 1993.

Primary Examiner—Gopal C. Ray
Attorney, Agent, or Firm—Finnegan, Henderson, Farabow, Garrett & Dunner, L.L.P.

[57]  ABSTRACT

An EIBB (external ISA bus bridge) in a DS-PCI/ISA bridge device has a circuit for executing conventional command cycles to access an I/O device on an external ISA bus, and a circuit for executing enhanced command cycles to access an Enhanced IDE device on the external ISA bus. The enhanced command cycles are executed at higher speeds than the conventional command cycles. When an ISA DMAC read/write accesses the enhanced IDE device on the external ISA bus, the EIBB asserts address latch enable (BALE) and address enable (AEN) signals so that the operation mode on the external ISA bus is switched from conventional command cycles to enhanced command cycles. After the read/write access to the enhanced IDE device is completed, the EIBB deasserts the BALE and AEN signals so that the operation mode of the external ISA bus switches to the conventional command cycles.

15 Claims, 8 Drawing Sheets

IDE DATA TRANSFER SPEED IN ATA-2

| ATA SPEC | TRANSFER SPEED | IOR/ICW PULSE WIDE | CYCLE TIME |
|---|---|---|---|
| MODE 0 | 3.33M BYTE/S | 165ns | 600ns |
| MODE 1 | 5.22M BYTE/S | 125ns | 383ns |
| MODE 2 | 8.33M BYTE/S | 100ns | 240ns |
| MODE 3 | 11.1 M BYTE/S | 80ns | 180ns |

(PRIOR ART)

FIG. 1

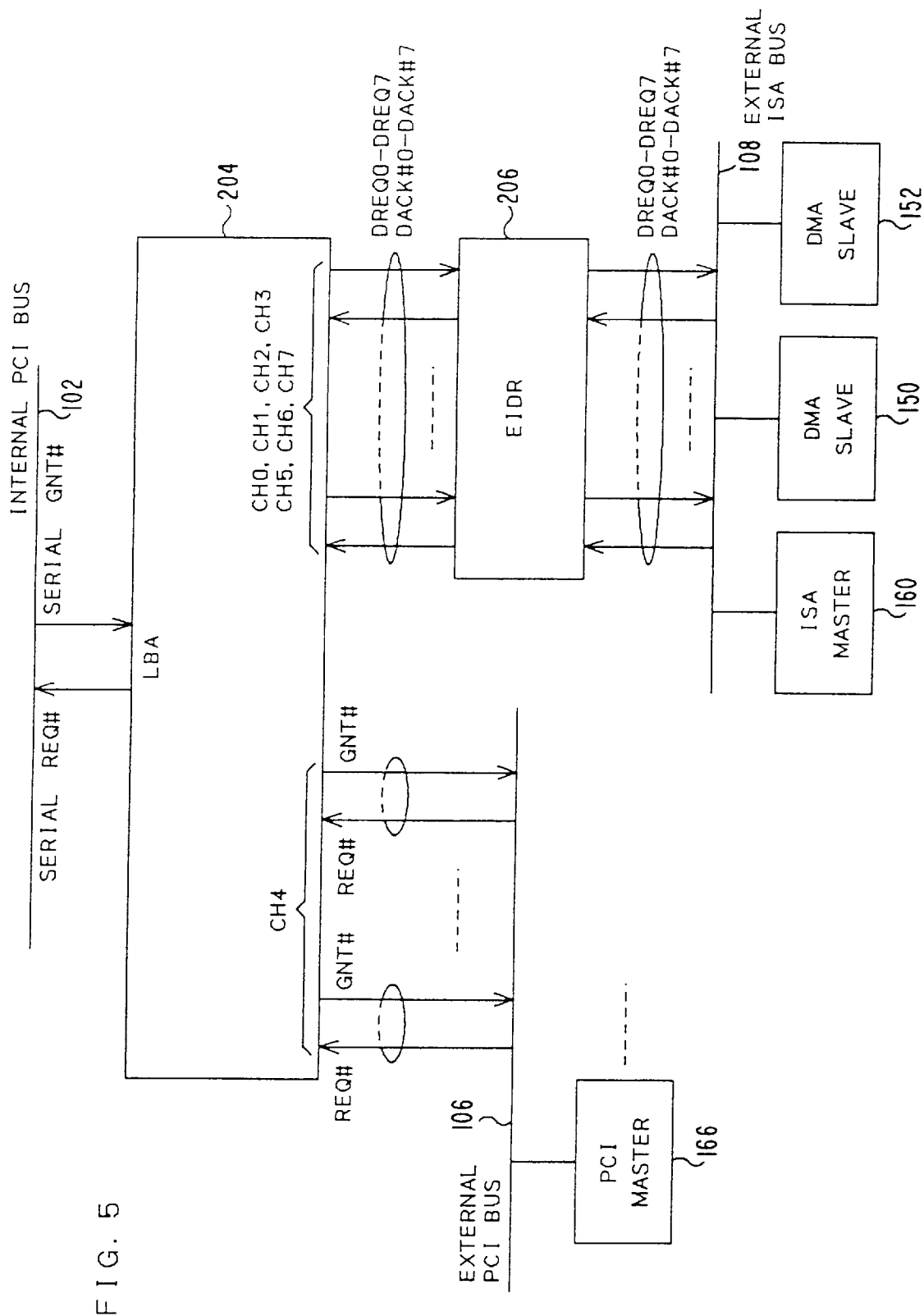
F I G. 5

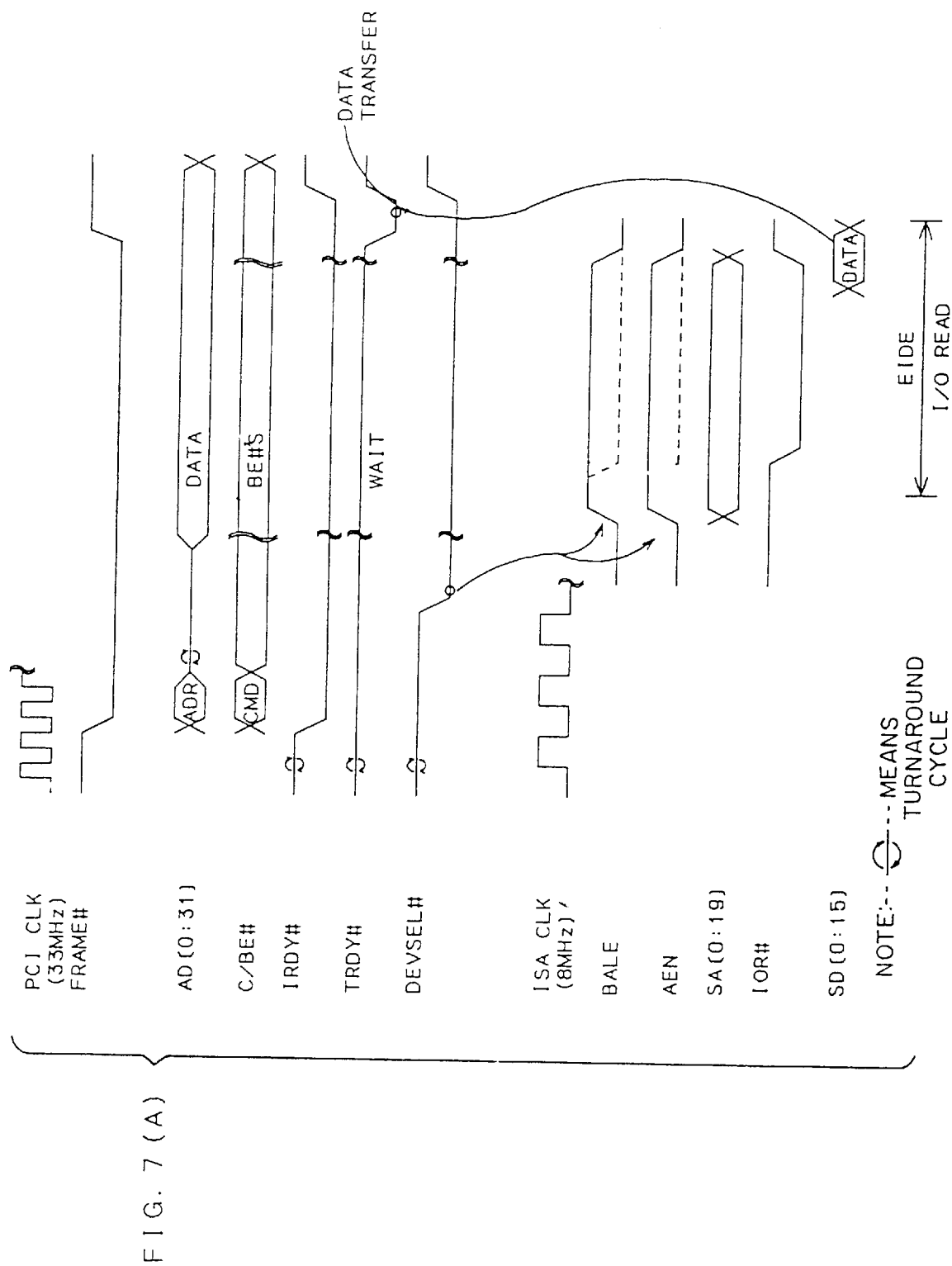

METHOD AND APPARATUS FOR CONTROLLING A COMMAND CYCLE ON A BUS

BACKGROUND OF THE INVENTION

1. Field of the Invention

This invention relates to computer systems and, more particularly, to improvements in the performance of an enhanced I/O device in a computer system.

2. Description of the Related Art

Standard system buses, such as ISA (Industry Standard Architecture) and EISA (Extended ISA) buses, are conventionally used in personal computers. Another standard bus, PCI (Peripheral Component Interconnect) bus, is commonly employed in desktop-type personal computers to increase the speed of data transfer and organize system architecture, independently of the kind of processors.

The ISA bus was originally a peripheral extended bus implemented in personal computers of the IBM Corporation. However, it has become a popular standard peripheral extended bus in personal computers. Also, the first ISA bus was operated at a 5 MHZ clock speed and as an I/O bus with an eight bit width. However, the present ISA bus is operated at an 8 MHZ clock speed and as an I/O bus with a 16 bit width.

The specification of the ISA bus was first established for the 8088 CPU of the Intel Corporation which was implemented in the IBM PC/XT computer. Later, the specification of the ISA bus was adapted to the 80286 CPU of the Intel Corporation which was implemented in the IBM PC/AT computer. The specification of the present ISA bus can implement a hard disk drive device and a CD-ROM device in a personal computer. These devices support an enhanced IDE (Integrated Device Electronics) interface. Hereafter, such devices are called Enhance IDE devices.

As shown in FIG. 1, an Enhanced IDE device has a different pulse width and cycle time for an IOR#/IOW# command according to each mode (mode 0–mode 3) regulated by the ATA (AT Attachment) standard. As a result, it is necessary to separate signal lines for a command of Enhanced IDE mode 1–mode 3 from a conventional command of IDE mode 0. An I/O device designed for mode 0 is not guaranteed to operate, if commands for mode 1–mode 3 are input to the I/O device.

On the other hand, for a PCI bus (regulated in accordance with the "PCI Local Bus Specification" production Version, revision 2.1, Jun. 1, 1995, of the PCI Special Interest Group), block transfer is the basis of substantially all data transfer. Transfer of each block is executed by burst transmission. For example, a maximum data transfer speed of 133 megabytes/sec. can be carried out on a data bus having a width of 32 bits.

Therefore, when a PCI bus is used, data transfer between I/O devices and between a system memory and an I/O device is executed at high speed. As such, system performance is increased.

The PCI bus is used in not only personal computers of a desktop type but personal computers of the portable or notebook type. However, because the specification of the PCI bus does not support a DMA transfer, it is necessary to install a DMAC (Direct Memory Access Controller) in the PCI bus system to use an ISA device with the PCI bus system.

SUMMARY OF THE INVENTION

It is an object of this invention to improve the performance of a computer system, while maintaining compatibility with conventional I/O devices.

Another object of this invention is to improve the performance of I/O devices independent of various kinds of interfaces supported by the I/O devices.

In accordance with the present invention, the foregoing objects, among others, are achieved by providing a computer system for controlling access to I/O devices connected to a bus, comprising a bus for having commonly connected thereto a conventional I/O device and an enhanced I/O device for executing enhanced data transfer, said bus having a plurality of I/O channels; means for degating the conventional I/O device from an I/O channel to allow the enhanced I/O device to be read/write accessed; and means for issuing an enhanced command cycle to the enhanced I/O device after the conventional I/O device is degated.

There has also been provided, in accordance with another aspect of the present invention, a method of controlling read/write access to an enhanced I/O device and a conventional I/O device connected to a bus having an I/O channel. The method comprises the steps of commonly connecting the conventional I/O device and the enhanced I/O device to the bus; degating the conventional I/O device from the I/O channel to allow the enhanced I/O device to be read/write accessed; and issuing an enhanced command cycle to the enhanced I/O device after the conventional I/O device is degated, the enhanced command cycle being capable of execution at a higher speed than a conventional command cycle to read/write access the conventional I/O device.

Further in accordance with the present invention, there is provided a computer system for controlling access to a conventional I/O device and an enhanced I/O device for executing enhanced data transfer, connected to a bus having a plurality of I/O channels. The computer system comprises means for degating the conventional I/O device from an I/O channel to allow the enhanced I/O device to be read/write accessed; means for issuing an enhanced command cycle to the enhanced I/O device after the conventional I/O device is degated; and wherein the enhanced command cycle is capable of execution at a higher speed than a conventional command cycle to read/write access the conventional I/O device.

Additional features and advantages of the invention will be set forth in the description which follows, and in part will be apparent from the description, or may be learned by practice of the invention. The objectives and other advantages of the invention will be realized and attained by the apparatus particularly pointed out in the written description and claims hereof, as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are incorporated in and constitute a part of this specification, illustrate embodiments of the invention and, together with the description, serve to explain the objects, advantages, and principles of the invention.

In the drawings:

FIG. 1 is a table showing IDE data transfer speed in an ATA specification.

FIG. 5 is a block diagram of a DS-PCI/ISA bridge device provided in the system of FIG. 3.

FIG. 7(A) is a timing chart illustrating read-access to an Enhanced IDE device on an external ISA bus.

DETAILED DESCRIPTION OF THE PREFERRED EMBODIMENTS

Figure 2:
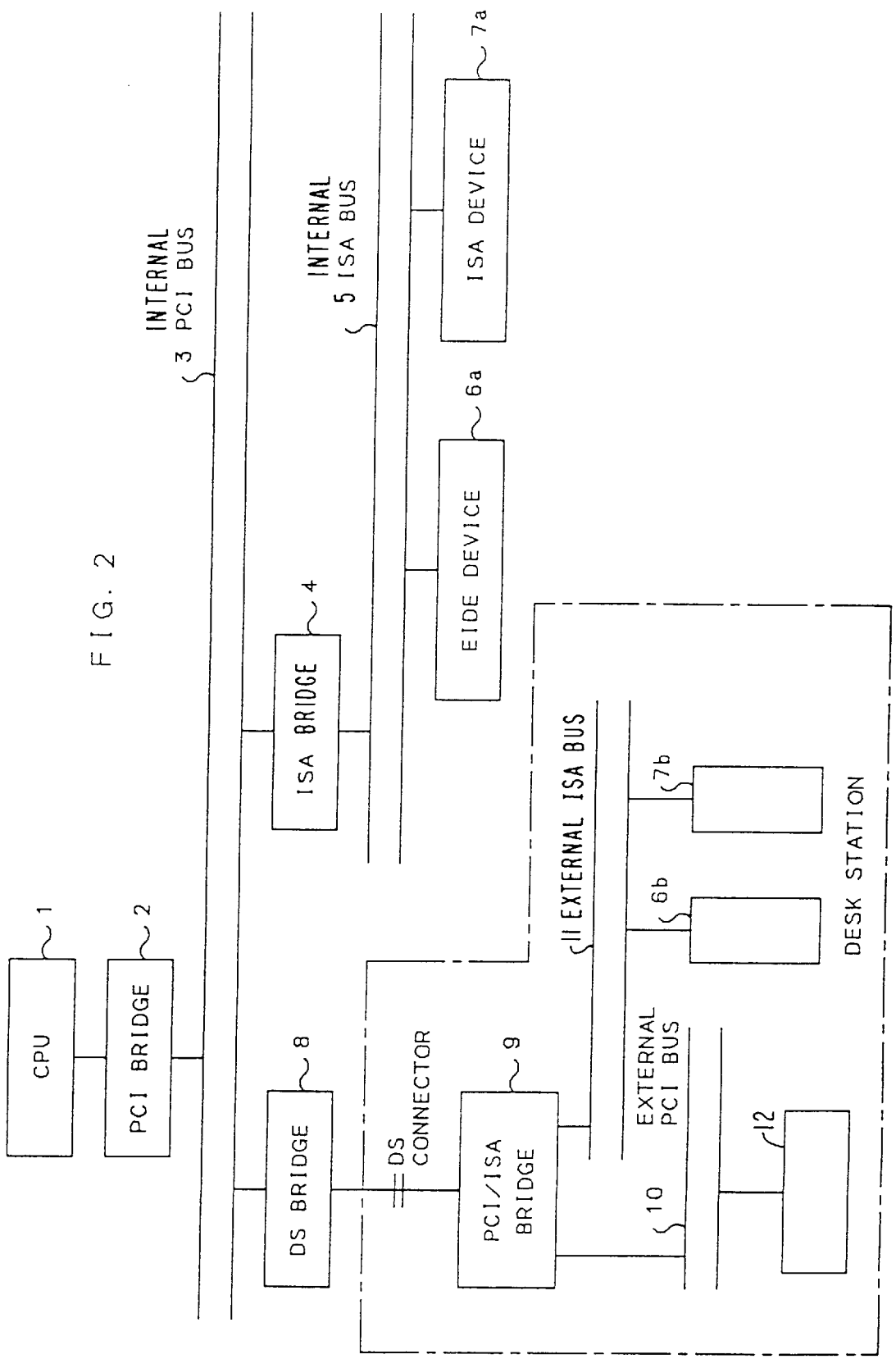
FIG. 2 is a block diagram showing a computer system with an extended unit.

FIG. 2 is a block diagram of a portable computer system with an extended unit provided as a desk station. The portable computer system includes an internal PCI bus 3 and an internal ISA bus 5. The desk station includes an external PCI bus 10 and an external ISA bus 11. The computer system uses a DMA serial channel protocol for transmitting and receiving DMA request signals (DREQ) and DMA acknowledgment signals (DACK#) between ISA expansion cards 6b, 7b connected to ISA bus 11 in the desk station and a DMAC core in an ISA bridge 4 connected between PCI bus 3 and the ISA bus 5, without using a plurality of pairs of DMA request signal (DREQ) lines and DMA acknowledgment signal (DACK#) lines.

The DMA serial channel protocol uses a pair of signals consisting of a bus access request signal (REQ#) and a bus access enable signal (GNT#) on PCI bus 3. In accordance with this protocol, DMA request signals (DREQ) of a plurality of channels are transferred from ISA expansion cards 6b, 7b to the DMAC core in ISA bridge 4 by means of a serial transfer of the DMA request signals (DREQ) and a bus access request signal (REQ#). Further, the DACK# are transferred from the DMAC core to ISA expansion cards 6b, 7b by means of serial transfer of the DMA acknowledgment signals (DACK#) and a bus access enable signal (GNT#) indicating access to the bus has been granted. Hereafter, REQ# and GNT# are used to indicate a serial transfer of DREQ and DACK# are designated serial REQ# and serial GNT#.

In a portable computer system as shown in FIG. 2 using serial channel protocol, external ISA bus 11, in addition to internal ISA bus 5 implemented in the main body of the computer system, is arranged in the desk station through a DS connector and a PCI/ISA bridge 9 connected to internal PCI bus 3. External ISA bus 11 can be used to connect two or more I/O devices such as external ISA devices 6b, 7b.

Moreover, in the computer system, external PCI bus 10 is connected at the desk station through the DS connector and a DS bridge 8 connected to internal PCI bus 3. Since external ISA devices 6b, 7b such as IDE devices and Enhanced IDE devices are installed in the desk station, it is necessary for PCI/ISA bridge 9 to control commands for both external PCI bus 10 and for external ISA bus 11 to support an external PCI device 12 and external ISA devices 6b, 7b. Thus, PCI/ISA bridge 9 has to control three types of commands for conventional IDE devices, Enhanced IDE devices and external PCI devices. However, it is not possible to provide the signal lines required for the Enhanced IDE device from PCI/ISA bridge 9 because there is a physical limitation on the number of connector pins of PCI/ISA bridge 9.

Hence, the interface in the desk station cannot support the commands for the three kinds of devices.

Figure 3:
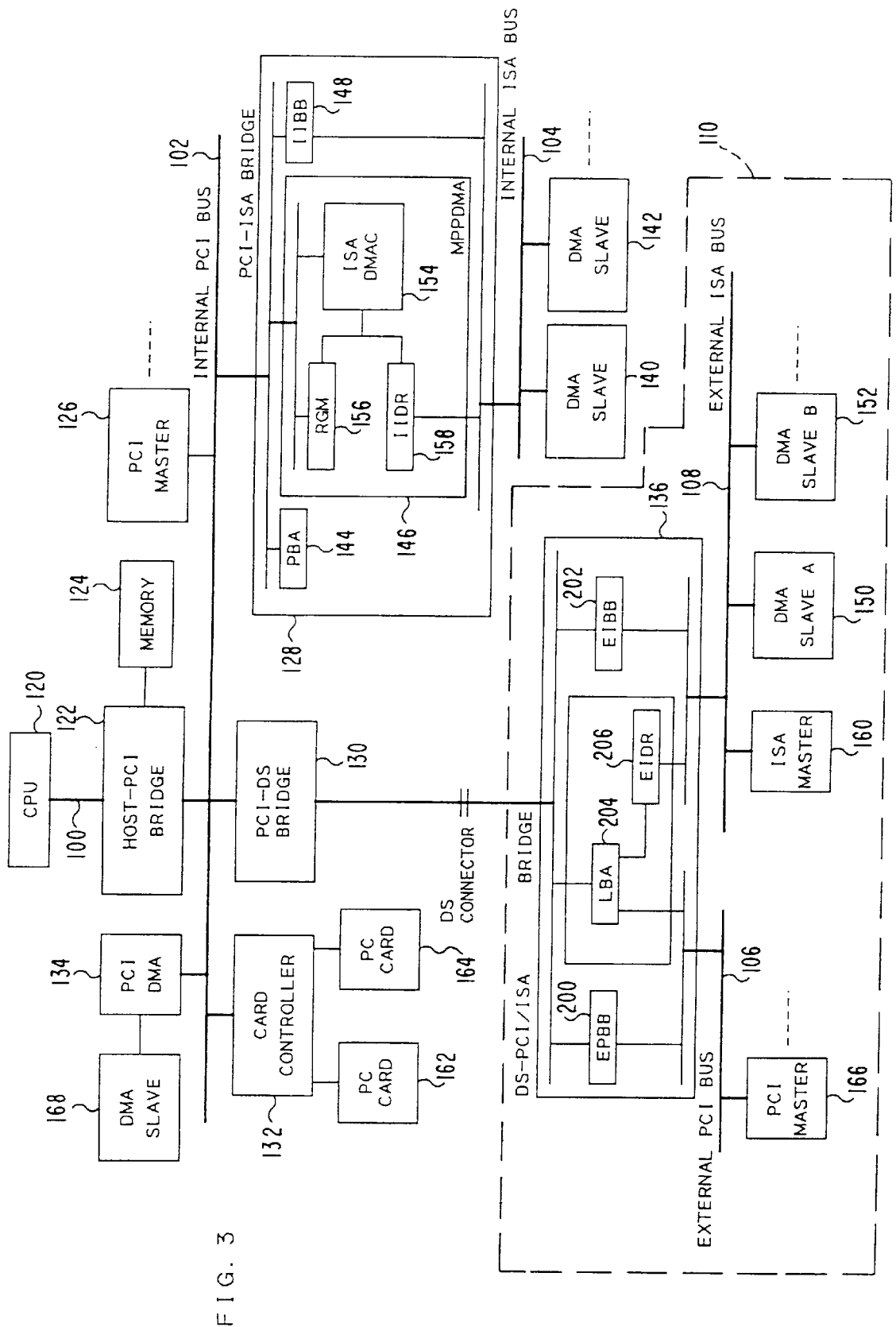
FIG. 3 is a block diagram showing a computer system in accordance with one embodiment of the present invention.

FIG. 3 shows the structure of a computer system, according to one embodiment of the present invention. The computer system can be provided as a notebook type or laptop type portable computer. As shown in FIG. 3, three types of buses, i.e., a processor bus 100, an internal PCI bus 102, and an internal ISA bus 104, are arranged on the system board thereof. An external PCI bus 106 and an external ISA bus 108 are arranged in a desk station 110 connected to a DS connector of the portable personal computer.

The system board of the portable computer includes a CPU 120, a host/PCI bridge device 122, a system memory 124, various types of PCI master devices 126, an internal PCI-ISA bridge device 128, a PCI-DS (DS: desk station) bridge device 130, a PC card controller 132, and a PCI DMA 134. Also, a DS-PCI/ISA bridge device 136 is provided in desk station 110.

CPU 120 is preferably a "Pentium" microprocessor sold by the Intel Corporation. Processor bus 100 is directly connected to input/output pins of CPU 120 and preferably has a 64-bit data bus.

System memory 124 is a memory device for storing an operating system, device drivers, application programs to be executed, and data for processing. Memory 124 is preferably formed by a plurality of DRAMs. System memory 124 is connected to host/PCI bridge device 122 via a memory bus having a 32-bit or 64-bit data bus. Processor bus 100 serves as a data bus for the memory bus. In such a case, the memory bus is formed by an address bus and various types of memory control signal lines.

Host/PCI bridge device 122 is a bridge LSI for coupling processor bus 100 and internal PCI bus 102, and functions as one bus master of PCI bus 102. Host/PCI bridge device 122 can directionally convert bus cycles including data and addresses, can control access of system memory 124 via the memory bus, between processor bus 100 and internal PCI bus 102.

Internal PCI bus 102 is a clock-synchronization type input/output bus. All cycles on internal PCI bus 102 are synchronized with a PCI bus clock. The clock speed of internal PCI bus 102 is preferably no greater than 33 MHZ. Internal PCI bus 102 has an address/data bus operated in a time division manner. This address/data bus has a width of 32 bits.

A data transfer cycle on internal PCI bus 102 includes an address phase and one or more data phases following thereafter. An address and transfer type are output in the address phase. 8-bit, 16-bit, 24-bit or 32-bit data are output in the data phases.

PCI master device 126 is one bus master of internal PCI bus 102 as well as host/PCI bridge device 122, and operates as an initiator or target. All devices on internal PCI bus 102 work as a target even without functioning as the bus master. The term "target" is used herein to describe a resource whose address is specified by an initiator, preferably a bus master, that began a transaction.

Internal PCI-ISA bridge device 128 is a bridge LSI for coupling internal PCI bus 102 and internal ISA bus 104. A read only memory and a plurality of ISA I/O devices 140, 142 are connected to internal ISA bus 104. These I/O devices, referred to as DMA slaves, are devices for requesting DMA transfer to a DMAC (DMAC controller) incorporated in internal PCI-ISA bridge device 128. A PCI bus arbiter (PBA) 144, a DMAC core (MPPDMA) 146 and an internal ISA bus bridge (IIBB) 148 are incorporated in internal PCI-ISA bridge device 128.

PCI bus arbiter (PBA) 144 arbitrates bus accesses between all bus master devices connected to internal PCI bus 102. In this arbitration, signal lines (a bus request signal REQ# line and a grant signal GNT# line) on internal PCI bus 102 are allocated in one pair to each bus master device.

A bus request signal REQ# is a signal for notifying PCI bus arbiter (PBA) 144 of a request from a device corresponding thereto to use internal PCI bus 102. A grant signal GNT# is a signal for notifying the device that issued a bus request signal REQ# that it has been granted access to internal PCI bus 102.

Also, in this system, among the plurality of pairs of REQ# and GNT# lines defined on internal PCI bus 102, one REQ# and GNT# line pair allocated to DS-PCI/ISA bridge device 136 is used for a DMA serial channel protocol for transmission and reception of DMA request signals (DREQs) and DMA acknowledgment signals (DACK#s) for DMA slaves, such as DMA slaves 150 and 152, connected to external ISA bus 108.

All of the bus request signal REQ# lines and grant signal GNT# lines on internal PCI bus 102 are connected to PCI bus arbiter (PBA) 144 which controls arbitration of requests for access to internal PCI bus 102.

DMAC core (MPPDMA) 146 includes an ISA DMA controller (ISA DMAC) 154, a bus request and grant manager (RGM: REQ#, GNT# manager) 156, and an internal ISA DMA router (IIDR) 158. DMAC core (MPPDMA) 146 is an independent function block within internal PCI-ISA bridge device 128. PBA 144 and IIBB 148 perform functions other than DMA.

Figure 4:
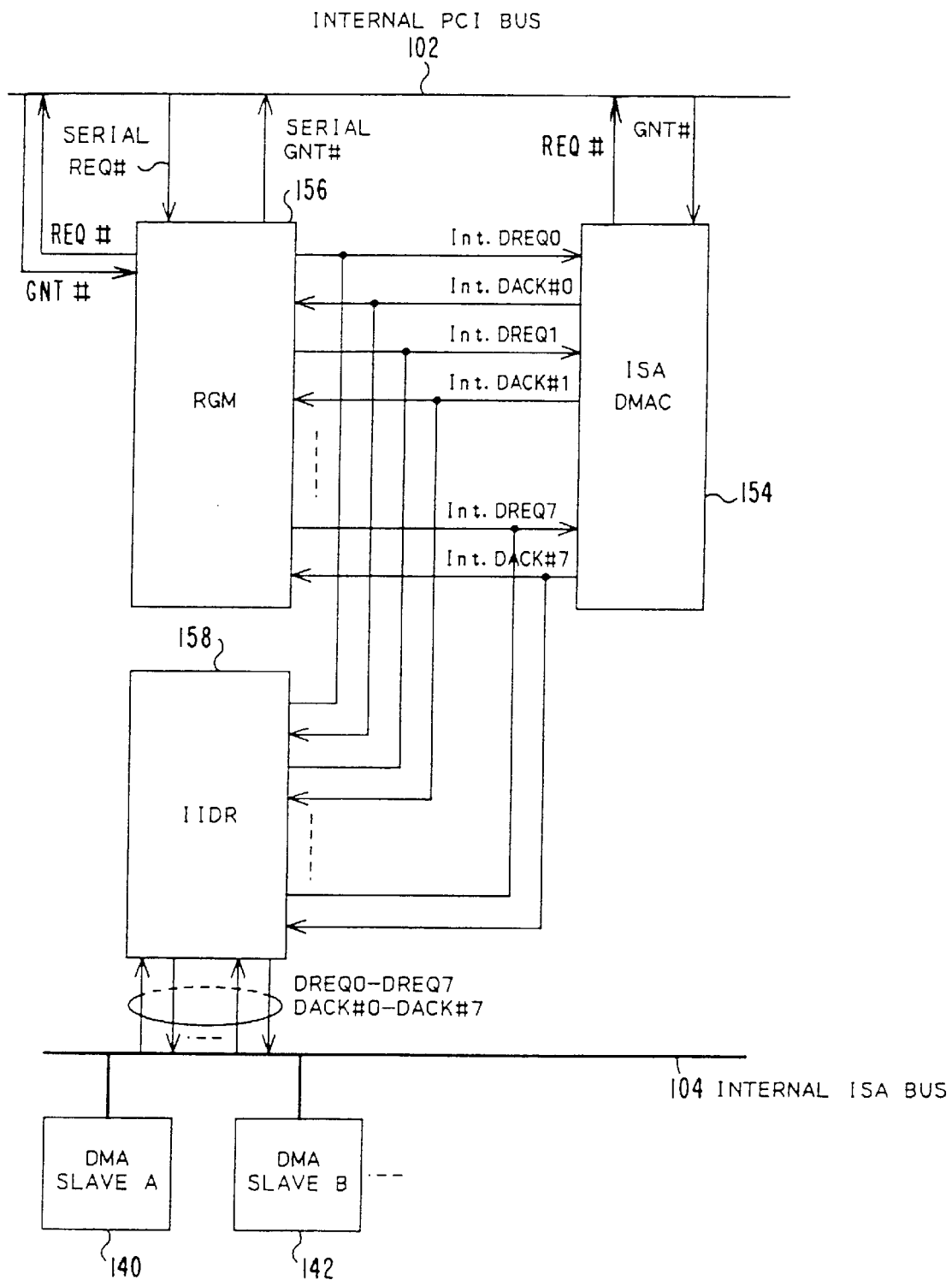
FIG. 4 is a block diagram of a DMAC core provided in the computer system of FIG. 3.

The specific connections of ISA DMAC 154, RGM 156, and IIDR 158 are illustrated in FIG. 4.

ISA DMAC 154 is one bus master connected to the internal PCI bus 102, and executes DMA transfer, according to a request from a DMA slave device requiring DMA transfer.

DMA slaves are logically connected to internal PCI bus 102. In most cases, they are connected to internal ISA bus 104 or external ISA bus 108 through bridge 128 or 136.

ISA DMAC 154 has a DREQ input port where internal DREQs 0 to 7 are input and a DACK# output port for outputting internal DACK#s 0 to 7. Both the DREQ input ports and the DACK# output ports are connected to RGM 156 and IIDR 158. Transmission and reception of DREQs and DACK#s between the. DMA slaves 140, 142, . . . and ISA DMAC 154 on internal ISA bus 104 are executed via IIDR 158. Also, transmission and reception of DREQs and DACK#s between an ISA master 160 and DMA slaves 150, 152 on external ISA bus 108 and ISA DMAC 154 are performed by DMA serial channel protocol via RGM 156.

Since ISA DMAC 154 is connected to internal PCI bus 102 and devices requesting DMA transfer are connected to internal ISA bus 104 or external ISA bus 108, a read cycle (I/O read or memory read) and a write cycle (memory write or I/O write) are not generated simultaneously during DMA transfer by ISA DMAC 154. That is, first, a read cycle is performed, after which the read data retrieved at that time are latched in a buffer in ISA DMAC 154. Next, a write cycle is executed and the previously latched data are output as write data.

ISA DMAC 154 generates both a read cycle and a write cycle on internal PCI bus 102, irrespective of whether the cycles are memory or I/O cycles. Further, bridge device 128 or 136 converts a bus cycle on internal PCI bus 102 to an ISA bus cycle. Namely, ISA DMAC 154 generates both memory cycles and DMA exclusive I/O cycles on internal PCI bus 102 and is not concerned with ISA bus cycles.

ISA DMAC 154 has preferably one 82C37 compatible function, which is the ISA bus system architecture standard, and supports DMA channels CH0 to CH7 by means of internal DREQs 0 to 7 and internal DACK#s 0 to 7. Among these channels, because DMA channel CH4 is used to cascade-connect two DMAC controllers, it is not used for DMA transfer. As a result, DREQ4 and DACK#4 among the internal DREQs 0 to 7 and internal DACK#s 0 to 7 are actually not connected to either RGM 156 or IIDR 158.

ISA DMAC 154 performs arbitration of DMA channels by using the internal DREQs 0 to 7 and internal DACK#s 0 to 7 organized as one pair for each DMA channel. The internal DREQ is a DMA request signal used to notify ISA DMAC 154 that a DMA slave is requesting execution of DMA transfer. The internal DACK# is a DMA acknowledgment signal by which ISA DMAC 154 notifies commencement of DMA cycle execution of the DMA slave which has requested DMA transfer. The DMA slave which is the subject of DMA transfer is selected by this DACK#.

Allocation of the DMA channels is exclusively performed between devices on internal ISA bus 104 and devices on external ISA bus 108. Each device transmits to and receives from ISA DMAC 154 the DREQ and DACK# corresponding to the DMA channel allocated thereto.

In this case, transmission and reception of the DREQ and DACK# between external ISA bus 108 and ISA DMAC 154, as described above, are executed according to the DMA serial channel protocol by using one pair of serial REQ# and serial GNT# signal lines.

The DMA serial channel protocol can decrease the number of signal lines that need to be provided to the desk station, and is used for both a PCI expansion card and a ISA expansion card in the desk station.

In this DMA serial channel protocol, the most recent DREQ state is transmitted from DS-PCI/ISA bridge device 136 by a serial REQ#. This is sent to RGM 156. In RGM 156, the serial REQ# is converted to internal DREQs 0 to 7 for ISA DMAC 154.

Further, channel information of DMA transfer indicated by the internal DACK#s 0 to 7 output from ISA DMAC 154 is sent to DS-PCI/ISA bridge device 136 by a serial transfer using the serial GNT# signal line and executed by RGM 156.

ISA DMAC 154 preferably performs 82C37 compatible arbitration between DREQ channels, according to setting and adjustment of a DREQ channel mask, based on the most recent DREQ channel information provided from RGM 156 and IIDR 158. If there is an effective DMA request (DREQ), ISA DMAC 154 first activates a REQ# allocated to itself and sends a request for bus access right to PCI bus arbiter (PBA) 144. ISA DMAC 154 waits for a GNT# to be granted by PBA 144.

When the GNT# is provided from PBA 144 to the ISA DMAC 154, ISA DMAC 154 activates an internal DACK# corresponding to a DMA channel number selected as a result of the arbitration. A DMA channel number at which DMA transfer has been requested for execution is returned to RGM 156 and IIDR 158. ISA DMAC 154 executes a DMA cycle corresponding to a DMA transfer mode (single transfer mode, block transfer mode, demand transfer mode, and cascade mode) regulated by setup information of the selected DMA channel. ISA DMAC 154 supports only bus cycles of the PCI bus for both memory and I/O cycles as described previously. The bus cycles on the ISA bus 104 or 108 are emulated by the bridge device 128 or 136.

RGM 156 serializes the plurality of DMA channels and manages the states of the serial REQ# and the serial GNT# in order to perform processes relating to the DMA serial channel protocol for transfer. RGM 156 performs conversion between the DMA serial channel protocol and the DREQ/DACK# protocol of the ISA format practiced by ISA DMAC 154.

REQ# signals are input to RGM 156. Also, the protocol of the REQ# is programmed for each REQ# signal. Consequently, if a number of pairs of REQ# and GNT# signal lines used for serial REQ#s and serial GNT#s are arranged, not only reception and transmission of DREQs and DACK#s between devices on external ISA bus 108 and ISA DMAC 154, which are performed through DS-PCI/ISA bridge device 136, but also reception and transmission of DREQs and DACK#s between, for example, PC cards 162 and 164 of PC card controller 132 and ISA DMAC 154, are performed in accordance with the DMA serial channel protocol.

RGM 156 converts between DMA serial channel protocol and REQ#/GNT protocol for arbitration of the standard PCI format supported by PBA 144. This is described in the publication "PCI Local Bus," Revision 2.01, Oct. 20, 1994, PCI Special Interest Group. In other words, not only reception and transmission of DREQs and DACK#s with devices on external ISA bus 108, but also reception and transmission of REQs and GNT#s with a PCI master 166 on external PCI bus 106 are performed using the DMA serial channel protocol. Processing of the REQ#s and GNT#s in this case is performed in the following manner by RGM 156.

PCI master 166, such as a LAN board or a SCSI board on external PCI bus 106, informs DS-PCI/ISA bridge device 136 of a bus access request by activating the REQ# line. DS-PCI/ISA bridge device 136 informs RGM 156 of the bus access request by serial data transfer by using the serial REQ#. In such a case, notification of the bus access request uses DREQ 106 which is the DMA channel not used by an ISA device.

RGM 156 serial-to-parallel converts the serial REQ# signal and, upon detecting that the DREQ 106 has been notified by the serial REQ#, activates the REQ# and makes a request to PBA 144 for bus access. PBA 144 arbitrates using the standard PCI rule and enables bus access for RGM 156 by means of a GNT#.

RGM 156, upon receiving the GNT# from PBA 144, notifies DS-PCI/ISA bridge device 136 by means of serial transfer using a serial GNT# to indicate that bus access was enabled. The DACK 4 is used in this notification. DS-PCI/ISA bridge device 136 serial-to-parallel converts the serial GNT# signal transmitted by RGM 156 and supplies the GNT# to PCI master 166. PCI master 166 commences a bus cycle upon receiving the GNT#.

Next, internal ISA DMA router (IIDR) 158 is explained.

Internal ISA DMA router (IIDR) 158 changes a mapped DMA channel to the DMA slaves 140, 142 on internal ISA bus 104, according to programmed mapping information. IIDR 158 converts the states of DREQ signals from the DMA slaves 140, 142 to internal DREQs corresponding to the DMA channel numbers of these devices, according to mapping information, and sends the internal DREQs to ISA DMAC 154. Further, IIDR 158 converts internal DACK#s from ISA DMAC 154 to DACK#s, which are actually used by the DMA slaves, according to mapping information, and outputs them to internal ISA bus 104.

Internal ISA bus bridge (IIBB) 148 is a bridge LSI for connecting internal PCI bus 102 and internal ISA bus 104, and controls all devices on internal ISA bus 104 such as memories and 110 devices. IIBB 148 protocol converts memory or I/O cycles generated on internal PCI bus 102 for DMA transfer by ISA DMAC 154, and sends them to internal ISA bus 104.

PCI-DS bridge device 130 is a bridge LSI for connecting internal PCI bus 102 and a desk station bus corresponding to the PCI bus leading out from desk station 110, and functions as an agent on internal PCI bus 102. A buffer for synchronizing transfer of serial REQ#s/GNT#s by means of DMA serial channel protocol is provided in PCI-DS bridge device 130.

PC card controller 132 is one of the PCI bus masters and supports DMA serial channel protocol. When PC cards controlled by PC card controller 132 request DMA transfer, this DMA request, i.e., DREQ, is transferred to RGM 156 by a serial transfer which uses the REQ# signal line allocated to PC card controller 132. Further, a DACK# from RGM 156 is sent to PC card controller 132 by the serial transfer, which uses the GNT# signal line allocated to PC card controller 132. The serial GNT# is serial-to-parallel converted into a DACK# by PC card controller 132 and passed along to the PC card 162 or 164.

PCI DMA 134 is an agent on internal PCI bus 102 similar to PC card controller 132 and supports DMA serial channel protocol. When a DMA slave 168 controlled by PCI DMA 134 requests DMA transfer, this DMA request, i.e., DREQ, is transmitted to RGM 156 by a serial REQ#. Also, a serial GNT# from RGM 156 is serial-to-parallel converted into a DACK# by PCI DMA controller 134 and provided to DMA slave 168.

DS-PCI/ISA bridge device 136 is a bridge LSI for connecting the desk station bus (operating as an extension of internal PCI bus 102), leading out to the desk station 110 from the main body of the portable computer via the DS connector, to external PCI bus 106 and external ISA bus 108. DS-PCI/ISA bridge device 136 is a PCI master similar to PC card controller 132 and supports DMA serial channel protocol.

DS-PCI/ISA bridge device 136 includes an external PCI bus bridge (EPBB) 200, an external ISA bus bridge (EIBB) 202, a local bus arbiter (LBA) 204 and an external ISA DMA router (EIDR) 206.

EPBB 200 receives through PCI-DS bridge device 130 memory cycles and I/O cycles generated by ISA DMAC 154 on internal PCI bus 102, and sends them to external PCI bus 106. Further, when a bus access enable is granted to PCI master 166 device on external PCI bus 106, EPBB 200 generates an external PCI bus transaction in the desk station.

EIBB 202 receives through PCI-DS bridge device 130 memory cycles and I/O cycles generated by ISA DMAC 154 on internal PCI bus 102, protocol-converts them, and sends them to external ISA bus 108. Further, where a bus access enable is granted to ISA master device 160 on external ISA bus 108, EIBB 202 generates an external ISA bus transaction in the desk station.

Further, EIBB 202 asserts AEN and BALE control signals, when an ISA device on external ISA bus 108 is an Enhanced IDE device. The BALE signal indicates an "address latch enable" for latching valid addresses from EIBB 202 on external ISA bus 108. It is provided to effect an enhanced transfer when it is used with the AEN signal. The BALE signal is forced to a high state during enhanced command cycles. The AEN signal is an "address enable" for degating EIBB 202 and enhanced IDE devices from the I/O channel to allow enhanced transfers to take place. Signal lines are provided from EIBB 202 to carry to BALE and AEN signals. When the AEN line is active, EIBB 202 has control of the address bus, the data-bus read command lines (memory and I/O), and the write command lines (memory and I/O). The operation of the enhanced transfer is explained in greater detail below.

LBA 204 and EIDR 206 are provided to support DMA serial channel protocol, and FIG. 5 shows details of their connections.

LBA 204 monitors changes in the states of bus access requests REQ# from the PCI bus master on external PCI bus 106 and DREQ signals (basically of the amount of ISA DMA channels) from ISA master 160 on external ISA bus 108 and DMA slaves 150, 152, and sends the most recent state through PCI-DS bridge device 130 by serial transfer of a bit string by using a serial REQ# to RGM 156.

The format of the bit string transmitted by a serial REQ# is as follows.

```
        s 0 1 2 3 4 5 6 7
REQ#    H,H,H,L,H,L,H,L,H,L,L,H,L,L, . . .
```

LBA 204 takes the leading edge of the activated REQ# as the start bit (S), thereafter using DMA channels 0 to 7 per each clock cycle and sending them in series. The cycle of channel 4 is used to send changes in the bus request state of PCI master 166, while all other channels are used to send changes in the states of DMA requests of ISA master 160 and the DMA slaves 150, 152 on external ISA bus 108.

In each bit string, a DMA request has been made if the start bit is "L." After the start bit, "L" is taken to mean that there is no request and "H" is taken to mean that there is a request. In the above example, DREQs 0, 2 and 7 are active and correspond to a state in which PCI master 166 on external PCI bus 106 is requesting bus access (DREQ 4 is active).

LBA 204 has two operating states (proceed and freeze). Until LBA 204 receives a serial GNT# from RGM 156, LBA 204 is in a proceed state and works to continuously send the most recent state to RGM 156. In other words, in the proceed state, whenever a change in the state of a REQ# of PCI bus master 166 on external PCI bus 106 or DREQs of ISA master 160 and DMA slaves 150, 152 on external ISA bus 108 is generated, RGM 156 is notified by DMA serial channel protocol.

When a serial GNT# is received from RGM 156, LBA 204 decodes the bit string including the serial GNT# and either returns a DACK# to EIDR 204 or returns a GNT# on external PCI bus 106.

The format of the bit string transmitted by the serial GNT# from RGM 156 is as follows.

```
        s 0 1 2
GNT#    H,H,H,L,H,L,L,L, . . .
```

RGM 156 takes the leading edge of the activated GNT# as the start bit (S). After the start bit (S), "H" is considered active, i.e., positive logic. After the start bit (S), RGM 156 allocates, one bit per one clock cycle, in sequence from the LSB, 3-bit coded information from one of the DMA channel DACK#s 0 to 7, and sends it in series. The code of channel 4, i.e., 001, is used to send a GNT# corresponding to a bus request state of PCI master 166 on external PCI bus 106, while all other codes are used to send DACK#s corresponding to DMA requests of ISA master 160 and the DMA slaves 150, 152 on external ISA bus 108.

The above example means that DMA channel 1, which is channel code=1, was selected (DACK1# was supplied).

Upon receiving a GNT#, the operating state of LBA 204 is switched from the proceed state to a freeze state. The freeze state is maintained until the device (PCI master, ISA master or DMA slave) corresponding to the GNT# withdraws its bus access request. During the freeze state, execution of serial REQ# cycles for reporting such operating states are frozen, even if changes in the states of other devices occur, and REQ#s continue to be maintained in active states.

In the DMA serial channel protocol of this system, the frame allocated by the use of PCI master 166 is channel 4 only, as a result of which in a case where a plurality of PCI masters exist on external PCI bus 106, arbitration between REQ#s from the plurality of PCI masters is performed by LBA 204.

EIDR 206 changes mapped DMA channels to ISA master 160 and DMA slaves 150, 152 on external ISA bus 108, according to programmed mapping information. By the cooperation of EIDR 206 and the previously described IIDR 158, DMA channels can be exclusively allocated to devices on internal ISA bus 104 and devices on external ISA bus 108. EIDR 206 changes the state of DREQ signals from each of ISA master 160 and DMA slaves 150, 152 to DREQ signals corresponding to the DMA channel numbers of these devices, according to mapping information and sends them to LBA 204. Further, EIDR 206 changes DACK#s from LBA 204 into DACK#s actually used by ISA master 160 and DMA slaves 150, 152, according to mapping information, and outputs them to external ISA bus 108.

Next, the flow of the DMA transfer process executed by ISA DMAC 154 is explained.

(1) DREQ Arrangement of ISA Interchange

ISA DMAC 154 receives an ISA compatible DREQ signal from IIDR 158 and RGM 156. Based on this, ISA DMAC 154 performs arbitration, and determines whether an effective (unmasked) DMA request exists and to which DMA channel the DACK# is to be returned.

(2) Generation of Internal PCI Bus Access Request

If there is an effective DMA request, ISA DMAC 154 generates a REQ# to PBA 144. However, at this time, the DMA channel for granting the DACK# is not determined. Further, when internal PCI bus 102 is in a locked state, generation of REQ#s is suppressed.

(3) Acquisition of Internal PCI Bus Access Enable

ISA DMAC 154, upon acquiring a GNT# from PBA 144, continues to output a bus access request REQ# until all necessary DMA transfer is completed. Normally, PCI bus cycles are generated a number of times. ISA DMAC 154 does not disconnect the bus access during transfer, even if the bus cycle finishes due to a target retry.

(4) Assertion of DACK#

ISA DMAC 154, at the point where a GNT# is acquired, determines the DMA channel for granting the DACK#. The DACK is returned to RGM 156 and IIDR 158. At the time when the DACK# is activated, the DMA channel is fixed. When RGM 156 receives the DACK#, it asserts a serial GNT# on internal PCI bus 102.

(5) Generation and Repetition of Bus Cycles

ISA DMAC 154 generates a bus cycle on internal PCI bus 102 from the time the DACK# is asserted. However, when the selected DMA channel has been programmed in cascade mode, a bus cycle is not generated.

The types of bus cycle are classified as three types: write transfer, read transfer and verify transfer, each in accordance with the content (transfer type) of a mode register of the selected DMA channel.

Write transfer (I/O read→memory write) is executed by taking the following two bus cycles as one group and repeating them the necessary number of times:

DMA-exclusive I/O cycle (read transfer)
memory write cycle

The DMA-exclusive I/O cycle (read transfer) is the same as the I/O read cycle of a standard PCI bus. However, the I/O address has a special meaning.

The I/O address is either one of:

00000000h: no TC
00000004h: TC exists, where TC is a signal indicating the end of the transfer count value, i.e., transfer completion. These addresses are allocated to 82C37 (DMAC), and no target other than ISA DMAC 154 corresponds thereto.

The agents which are I/O targets are all bridges having paths which have received a DACK#. For example, in the case a DACK# has been granted to a DMA slave on external ISA bus 108 by means of a serial GNT#, PCI-DS bridge device 130 and EIBB 202 of DS-PCI/ISA bridge device 136 correspond thereto.

EIBB 202 in PCI-DS bridge 130 outputs a command (IOR#) on external ISA bus 108. When the address specifies TC (00000004h), a TC signal is output to external ISA bus 108. At this time, a DACK# has already been output by EIDR 206. Thereby, if EIBB 202 has generated an IOR# command on external ISA bus 108, read data is output from a DMA slave selected by the DACK# on external ISA bus 108. PCI-DS bridge 130 sends this read data from external ISA bus 108 to internal PCI bus 102.

The read data is latched by ISA DMAC 154. This data is used as write data in the memory write cycle generated by ISA DMAC 154 immediately afterward.

The memory write cycle is the same as the memory write cycle of a standard PCI bus.

A memory address is created from a current address register and a page register incorporated in ISA DMAC 154. Write data latched by the DMA-exclusive I/O cycle (write) generated by ISA DMAC 154 immediately prior thereto is used. In a single transfer, one byte (8 bit DMA) or two bytes (16 bit DMA) is/are generated.

Host-PCI bridge device 122, which is one target, receives the memory write data from the standard PCI master, for example, PCI master 126, and write accesses the system memory. Even when completed due to a retry, ISA DMAC 154 regenerates the same memory cycle after placing it on standby for a short time. During this time, ISA DMAC 154 does not release internal PCI bus 102.

Figure 6:
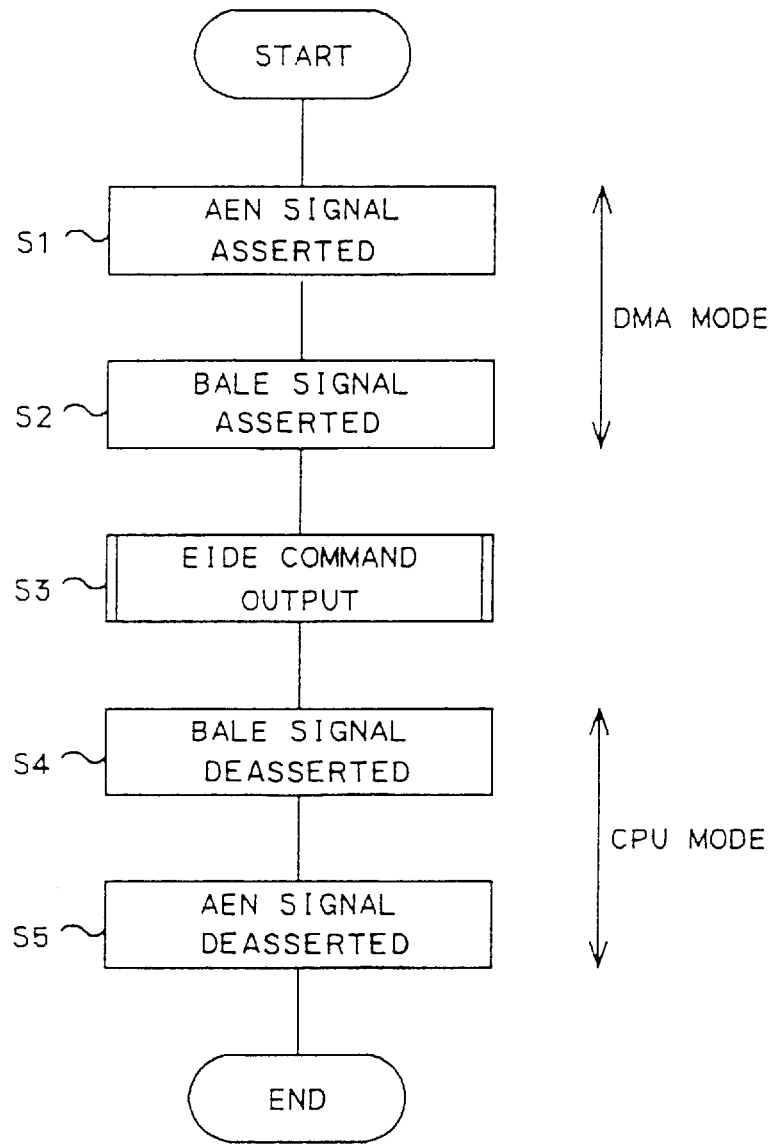
FIG. 6 is a flow chart illustrating the operation to access an Enhanced IDE device on an external ISA bus in accordance with one embodiment of the present invention.

The provision of DMA slaves 150 and 152 as conventional and Enhanced IDE devices is considered next. In this regard, the conventional and Enhanced IDE devices are commonly connected to external ISA bus 108. As used herein, commonly connected means the connection of the I/O devices to common ones of the data, address, and control lines of external ISA bus 108. FIG. 6 shows operation to access an Enhanced IDE device on external ISA bus 108, that is, an enhanced transfer.

When a master device on internal PCI bus 102 read/write accesses an Enhanced IDE device on external ISA bus 108, the read/write access request is transmitted to DS-PCI/ISA bridge 136 through PCI-DS bridge 130 and the DS connector. EIBB 202 in DS-PCI/ISA bridge 136 asserts AEN and BALE signals on external ISA bus 108. As a result, an operation mode of EIBB 202 is switched from a normal (CPU) mode to an enhanced transfer mode by asserting the BALE and AEN signals on external ISA bus 108 (steps S1–S2 in FIG. 6). Hence, the other ISA devices commonly connected to external ISA bus 108 recognize that an enhanced transfer on external ISA bus 108 is in progress. As a result, the other conventional ISA devices stop read/write-accessing on external ISA bus 108.

Next, EIBB 202 executes an enhanced command cycle (IOR#/IOW#) on external ISA bus 108 according to the operation mode of the Enhanced IDE device, and read/write-accesses to the Enhanced IDE device (step S3 in FIG. 6).

When the read/write-accesses to the Enhanced IDE device have finished, EIBB 202 returns the operation mode of external ISA bus 108 to the CPU mode by deasserting the BALE and AEN signals. Thus, it switches to a conventional command cycle (steps S4–S5 in FIG. 6).

Timing charts illustrating read-access of the enhanced IDE device are explained with reference to FIG. 7(A).

A master device on internal PCI bus 102 starts a read transaction in an address phase when FRAME# is asserted by the master device for the first time. During the address phase, an AD signal contains a valid address to the Enhanced IDE device and a C/BE# signal contains a valid bus command (0010).

During a data phase, the C/BE# signal indicates which byte lanes are involved in the current data phase. The current data phase consists of a data transfer and wait cycles. Output buffers of the master device holding the C/BE# signal remain enabled from the first clock of the data phase through the end of the read transaction. This ensures the C/BE# signals are not left floating for long intervals.

The first data phase of the read transaction requires a turnaround cycle caused by EIBB 202 via a target ready signal TRDY#, such turnaround cycle being as defined in the above-referenced PCI bus specification. EIBB 202 generates a device selection signal DEVSEL# and then outputs data on the AD lines to internal PCI bus 102 via the desk station bus, following the turnaround cycle. Once enabled, AD output buffers in the master device stay enabled through the end of the read transaction.

When EIBB 202 is specified as a target in the read transaction by decoding the AD and C/BE# signals, EIBB 202 asserts DEVSEL#. Also, EIBB 202 activates BALE and AEN signals in synchronism with an external ISA clock.

Further, EIBB 202 outputs an SA signal (1F0–1F8h) to select the Enhanced IDE device on external ISA bus 108. A system address signal SA addresses memory and I/O devices on external ISA bus 108. The SA signals are gated on external ISA bus 108 when the BALE is high and latched on the falling edge of the BALE.

After the lines carrying the BALE, AEN and SA signals are driven, EIBB 202 also generates an I/O read command IOR# on external ISA bus 108 according to the operation mode (timing) of the Enhanced IDE device. For example, the operation mode is IDE mode 3 in the ATA standard. When the Enhanced IDE device is ready, it outputs read data on SD lines of external ISA bus 108 according to the IDE mode 3. The SD lines carry data bus bits "D0–D15" on external ISA bus 108 for memory and I/O devices. The enhanced IDE device uses D0–D15 lines on external ISA bus 108.

When the BALE and AEN signals are indicated as dotted lines in FIG. 7(A), it means that EIBB 202 generates normal ISA command cycles to access the other ISA devices.

When EIBB 202 receives the read data on external ISA bus 108 according to the IDE mode 3, it drives TRDY# on internal PCI bus 102 through PCI-DS bridge 130. EIBB 202 transfers the read data onto internal PCI bus 102 according to BE# on the C/BE#, when both IRDY# and TRDY# are asserted on the same clock edge. TRDY# cannot be driven until DEVSEL# is asserted. Also, FRAME# is deasserted when IRDY# is asserted on the last clock edge in the read transaction.

Next, timing charts illustrating write-access of the enhanced IDE device are explained with reference to FIG. 7(B).

A master device on internal PCI bus 102 starts a write transaction in an address phase when FRAME# is asserted by the master device for the first time. A write transaction is similar to the read transaction except no turnaround cycle is required following the address phase, because the master device provides both address and data. Data phases work the same for both read and write transactions.

EIBB 202 decodes addresses and a bus command (0011) output by the master device. When EIBB 202 drives TRDY# during the asserted IRDY#, the master device generates write data on internal PCI bus 102. When EIBB 202 receives the write data through PCI-DS bridge 130, it stores the write data in built-in buffers, following which it generates ISA bus cycles on external ISA bus 108. For example, if the master device accesses the Enhanced IDE device on external ISA bus 108, EIBB 202 makes BALE and AEN signals active and outputs SA (1F0–1F8h) in synchronism with the external ISA bus clock.

After the BALE, AEN and SA signal lines are driven, EIBB 202 also generates an I/O write command IOW# on external ISA bus 108 according to the operation mode (timing) of the enhanced IDE device. For example, it is IDE mode 3 in the ATA standard. When the Enhanced IDE device is ready, EIBB 202 outputs write data on SD lines of external ISA bus 108 according to the IDE mode 3. The Enhanced IDE device receives the write data and stores them therein.

Figure 7B:
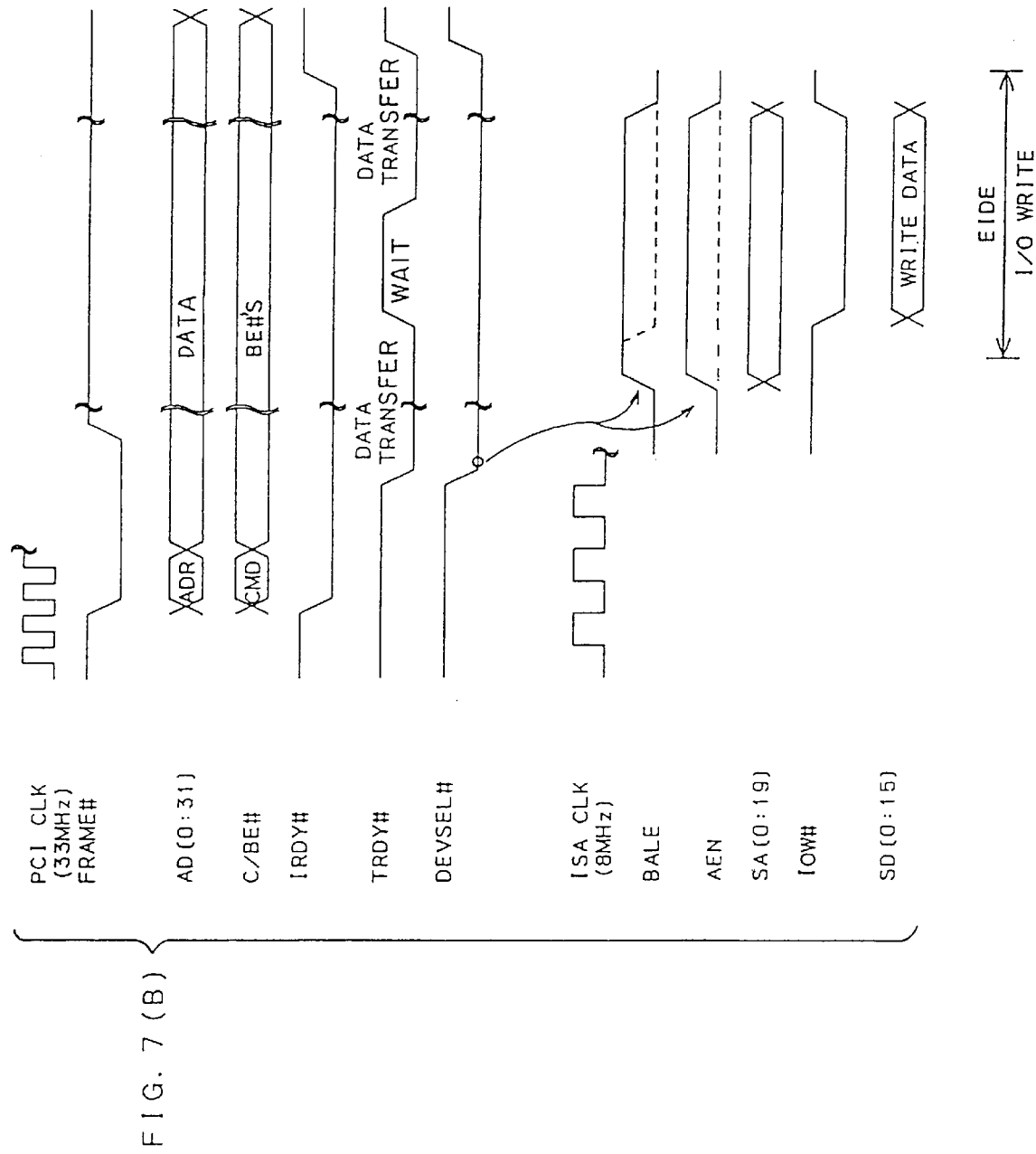
FIG. 7(B) is a timing chart illustrating write-access to an Enhanced IDE device on an external ISA bus.

On the other hand, when the BALE and AEN signals are indicated as the dotted lines in FIG. 7(B), it means that EIBB 202 generates normal ISA command cycles to access the other conventional ISA devices.

Further, in FIG. 7(B), the data phase has certain wait cycles inserted by EIBB 202. These wait cycles are inserted when the buffers in EIBB 202 are filled with write data. After the last of the write data is received by EIBB 202, the write transaction is concluded when FRAME# and IRDY# are both deasserted by the master device.

In accordance with the present invention, separate signal lines for the operation mode of Enhanced IDE device and the operation mode of conventional ISA device are not needed to be provided to the desk station 110. Also, access depending on the IDE mode of an I/O device becomes possible on the desk station.

The access to an Enhanced IDE device on external ISA bus 108 has been explained in accordance with one embodiment of the present invention. However, the present invention may also be applied in PCI-ISA bridge 128 in the computer main body where the lack of pins from PCI-ISA bridge 128 is caused because the PCI-ISA bridge 128 cannot provide signal lines to accommodate the types of ISA devices on internal ISA bus 104.

According to the disclosed embodiment of present invention, when the CPU accesses an Enhanced IDE device on an external ISA bus, the operational mode of the external ISA bus is shifted to an enhanced transfer mode by first activating AEN and BALE signals on the external ISA bus. While AEN and BALE signals are being activated on the external ISA bus, conventional ISA devices on the external ISA bus recognize that the enhanced transfer on the external ISA bus is in progress. As a result, the operation of the conventional ISA devices is stopped and a command cycle depending on the mode of the Enhanced IDE device is issued on the external ISA bus. When the access to the Enhanced IDE device is completed, the AEN signal and BALE signals on the external ISA bus are deactivated to return the operation mode of the external ISA bus to a normal mode.

Thus, the command cycles on the external ISA bus are switchable depending on a mode of an Enhanced IDE device. It is possible to perform a data transfer based on the performance of the I/O device on the external ISA bus. As a result, specific signal lines depending on the types of the I/O devices are not required. For example, in the present embodiment, DS-PCI/ISA bridge 136 does not have different signal lines for different types of I/O devices.

It will be apparent to those skilled in the art that various modifications and variations can be made in the disclosed process and product without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer system for controlling access to I/O devices connected to a bus, comprising:

a main body having a first bus coupled to a central processor;

an extended unit connected to the main body through a connector, the extended unit having a second bus, the second bus for having commonly connected thereto a conventional I/O device and an enhanced I/O device for executing enhanced data transfer, said first bus having a plurality of I/O channels;

bridge means coupled between the first bus and the second bus;

a bus arbiter, coupled to the first bus, for arbitrating bus accesses by using each of a pair of a bus access request signal line and a bus access enable signal line assigned to bus agents on the first bus;

means for degating the conventional I/O device from an I/O channel to allow the enhanced I/O device to be read/write-accessed, the conventional I/O device having a first command cycle for read/write access;

means, coupled to the bridge means, for issuing an enhanced command cycle to the enhanced I/O device after the conventional I/O device is degated, the enhanced I/O device having a second command cycle capable of execution at a higher speed than the first command cycle; and a DMA controller, coupled to the PCI bus, for executing direct memory access (DMA).

2. The computer system of claim 1, wherein the degating means includes conventional-to-enhanced means for switching an operation mode on the bus from the first command cycle to the second command cycle.

3. The computer system of claim 2, further comprising enhanced-to-conventional means for switching the bus operation mode from the second command cycle to the first command cycle, after the access to the enhanced I/O device is completed.

4. The computer system of claim 3, wherein the enhanced-to-conventional switching means includes means for issuing the first command cycle to the first I/O device.

5. The computer system of claim 4, wherein the degating means includes means for asserting an address latch enable signal on the bus for latching valid addresses on the bus.

6. The computer system of claim 1, wherein the degating means includes means for asserting an address enable signal on the bus for allowing enhanced data transfers.

7. The computer system of claim 1, wherein the second bus is an external ISA (Industry Standard Architecture) bus.

8. The computer system of claim 1, wherein the first bus is an internal PCI (Peripheral Component Interconnect) bus.

9. The computer system of claim 8, further comprising transaction means for commencing a transaction on the internal PCI bus to read/write access one of the conventional I/O device and enhanced I/O device on the external ISA bus.

10. The computer system of claim 1, wherein the second and first command cycles conform to an ATA standard specification.

11. A computer system for controlling access to I/O devices, comprising:

an internal PCI bus;

a central processor coupled to the PCI bus;

a system memory for storing an operating system and data for processing, coupled to the PCI bus;

an external ISA bus;

a conventional IDE device coupled to the ISA bus, the conventional IDE device having a first command cycle to be read/write accessed;

an enhanced IDE device coupled to the ISA bus, the enhanced IDE having a second command cycle being capable of execution at a higher speed than the first command cycle, the conventional and enhanced IDE devices being commonly connected to the ISA bus;

bridge means coupled between the PCI and ISA buses;

means, included in the bridge means, for degating the conventional IDE device from an I/O channel to allow the enhanced IDE device to be read/write accessed; and means, included in the bridge means, for issuing the second command cycle to the enhanced IDE device after the conventional IDE device is degated.

12. The computer system of claim 11 the system further comprising:

a bus arbiter, coupled to the PCI bus, for arbitrating bus accesses by using each of a pair of a bus access request signal line and a bus access enable signal line assigned to bus agents on the PCI bus;

a DMA controller, coupled to the PCI bus, for executing direct memory access (DMA);

a converter, coupled between the ISA bus and the PCI bus and being a bus agent on the PCI bus, for converting states of DMA request signals output from the conventional and enhanced I/O devices into first serial information, and for transmitting the first serial information using the bus access request signal lines assigned thereto; and request and grant manager means, coupled to the PCI bus and the DMA controller, for converting the transmitted first serial information into a plurality of DMA request signals for inputting to the DMA controller, for converting respective states of a plurality of DMA acknowledgment signals outputted from the DMA controller into second serial information, and for transmitting the second serial information to the converter by using the bus access enable signal line assigned to the converter.

13. The computer system according to claim 12, wherein the converter is a PCI-ISA bridge; and wherein the PCI-ISA bridge includes bus cycle converting means for converting a bus cycle on the PCI bus into a bus cycle on the ISA bus.

14. A computer system for controlling access to I/O devices connected to a bus, comprising:

a main body having a first bus coupled to a central processor;

an extended unit connected to the main body through a connector, the extended unit having a second bus, the second bus for having commonly connected thereto a conventional I/O device and an enhanced I/O device for executing enhanced data transfer, said first bus having a plurality of I/O channels;

bridge means coupled between the first bus and the second bus, wherein the first bus is a PCI bus and the second bus is an ISA bus;

a bus arbiter, coupled to the PCI bus, for arbitrating bus accesses by using each of a pair of a bus access request signal line and a bus access enable signal line assigned to bus agents on the PCI bus;

a DMA controller, coupled to the PCI bus, for executing direct memory access (DMA);

a converter, coupled between the ISA bus and the PCI bus and being a bus agent on the PCI bus, for converting states of DMA request signals output from the conventional and enhanced I/O devices into first serial information, and for transmitting the first serial information using the bus access request signal lines assigned thereto; and request and grant manager means, coupled to the PCI bus and the DMA controller, for converting the transmitted first serial information into a plurality of DMA request signals for inputting to the DMA controller, for converting respective states of a plurality of DMA acknowledgment signals outputted from the DMA controller into second serial information, and for transmitting the second serial information to the converter by using the bus access enable signal line assigned to the converter.

15. The computer system according to claim 14, wherein the converter is a PCI-ISA bridge; and wherein the PCI-ISA bridge includes bus cycle converting means for converting a bus cycle on the PCI bus into a bus cycle on the ISA bus.

* * * * *